Sept. 2, 1958             I. ORT             2,849,910
PERCUSSION DRUM
Filed Feb. 6, 1956             2 Sheets-Sheet 1
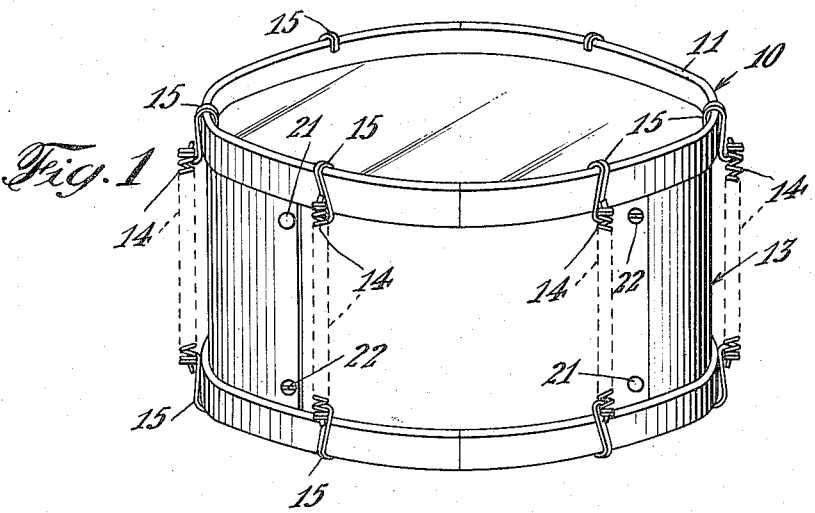
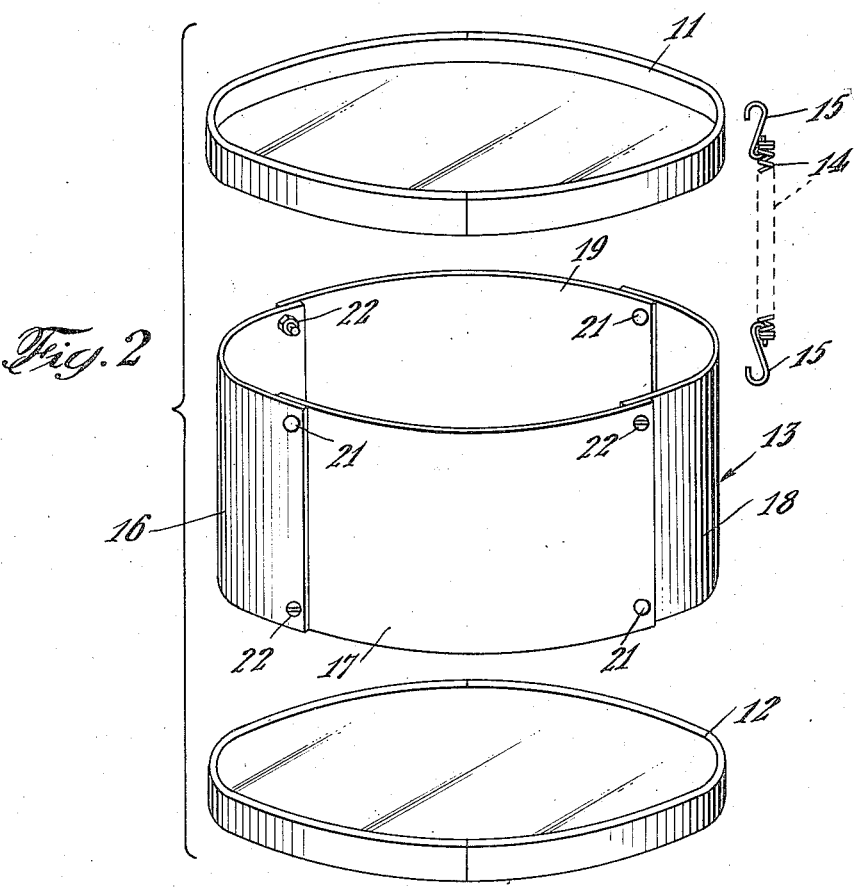

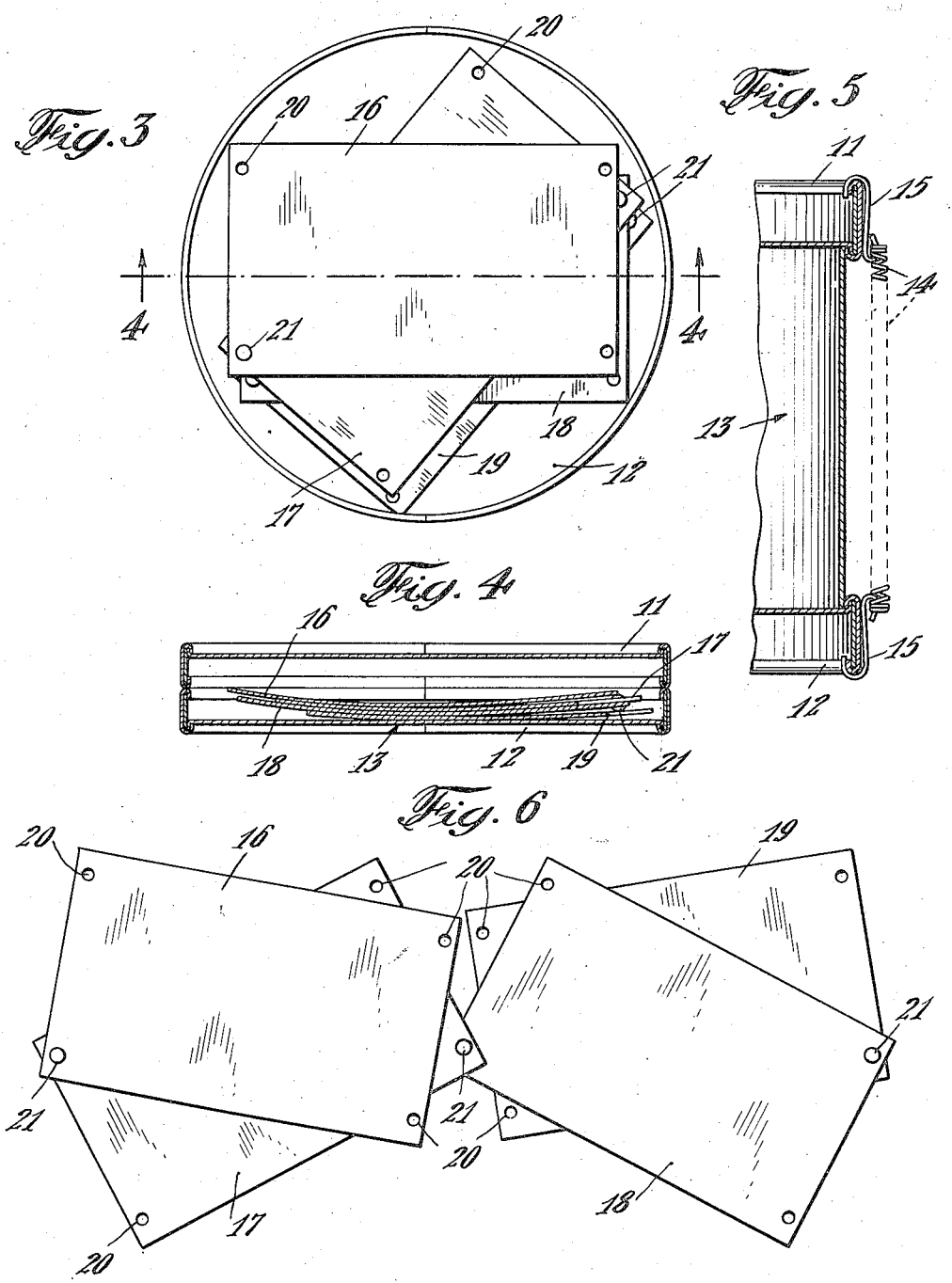

United States Patent Office 2,849,910
Patented Sept. 2, 1958

2,849,910

PERCUSSION DRUM

Irving Ort, Lynbrook, N. Y.

Application February 6, 1956, Serial No. 563,464

2 Claims. (Cl. 84—412)

This invention relates to toy percussion drums and more particularly to such a toy drum having an improved frame construction.

The tone of such an instrument as a drum is determined to a large extent by its physical dimensions. Consequently, in order to provide a desirable tone quality it is necessary to provide an instrument of appreciable size even though it may be intended as a toy or to be low in cost. The size of such devices has heretofore proven to be a serious deterrent not only because of the increase in the cost thereof due to the large volume of warehouse space required, but also because it is often impossible to make available such a large volume of storage space. The bulk of such devices is a drawback in their handling throughout the channels of trade and particularly in the case of the retailer who has limited space facilities and who, therefore, may not be able to maintain a stock of such items.

It is, therefore, a principal object of this invention to provide an improved drum construction especially well adapted to mass production and distribution methods.

A more specific object is to provide such a drum construction which not only produces desirable tones when sounded but which may be readily assembled and erected thereby making it possible to package its various parts in a disassembled condition in a space considerably less than that required for the erected drum.

In accordance with this invention the drumheads, of a double-ended drum, are formed as subassemblies with the diaphragms each stretched and maintained taut by an axially short, ring member. The frame subassembly is formed of sheet material having a length such that it may be conformed to a cylindrical shape with a radius slightly less than that of the drumhead rings. The frame comprises a plurality of elongated members of such length that each may nest within the drumhead rings. The members forming the frame are joined in substantially end to end relation when assembld and with the free ends of the outermost frame members joined the frame is formed into a cylinder on the open ends of which the drumhead subassemblies are associated.

Further objects and advantages of this invention will be apparent from the following description and the accompanying drawings in which:

Figure 1 is a perspective view of a drum constructed in accordance with this invention;

Figure 2 is an exploded view showing the final step in the assembly of the drum;

Figure 3 is a plan view of the frame members nested within one of the drumheads;

Figure 4 is a sectional view along the line 4—4 of Figure 3 with the second drumhead shown in position to complete the packaged relationship of the various parts;

Figure 5 is a fragmentary vertical sectional of the assembled drum on a slightly larger scale; and Figure 6 is a plan view showing an intermediate step in the handling of the members forming the drum frame.

Referring now to the drawings in detail drum 10 comprises a pair drumheads 11, 12 mounted at opposite ends of a cylindrical drum frame 13. As most clearly shown in Figure 2, means are provided whereby the two drumheads 11, 12 and frame 13 may be readily and quickly assembled. Preferably the arrangement is such that the parts may be readily assembled and disassembled at will as will be pointed out.

The drumheads comprise suitable membranes stretched and clamped on ring members designated respectively 11, 12. The ring members may be formed in any convenient manner and in the present instance they are formed from sheet metal so as to be somewhat C-shaped in cross section. The turned edges rigidify and strengthen the ring members and provide a convenient clamp for securing the membrane thereto.

Frame 13 is shown fully assembled in Figure 2 and just prior to mounting of the drumheads thereon. As indicated the drumheads are readily mounted and retained on the open ends of frame 13 by means of springs 14 each of which has a hook 15 connected to its ends for engaging the outwardly presented ends of ring members 11 and 12. Frame 13 comprises sheet members 16, 17, 18 and 19 substantially equal in size and rectangular in shape. A hole 20 is formed adjacent each corner of members 16—19 permitting their being joined in slightly lapped relation to form a cylinder having a diameter slightly less than that of ring members 11, 12. A permanent fastening such as a rivet 21 is utilized in one of the holes 20 between members 16—17, 17—18 and 18—19 with rivets 21 alternating from top to bottom. Each frame member is thereby joined by a rivet 21 to an adjacent member at diagonally opposite holes 20 while leaving one end of members 16 and 19 free. The erection of frame 13 is completed by means of bolts 22 which are inserted in the remaining holes 20 and serve to bring the free ends of members 16 and 19 together.

With bolts 22 removed frame members 16—19 may be readily formed into a compact pack by rotating member 16 in front of member 17 while member 19 is rotated to a position behind member 18 as indicated in Figure 6. The parts are then readily formed in a compact pack (Figures 3 and 4) by rotating members 16, 17 together into position in front of members 18, 19. As thus arranged, members 16—19 readily fit within the circumference of ring members 11, 12.

It will be readily appreciated from the known relaship between the circumference of a circle and its diameter, ignoring for the moment the small difference between the diameter of the frame and the ring members, that in order for the frame members to have any appreciable width and still seat within the ring members their axial length must be substantially less than ⅓ the circumference of the cylindrical frame. While frame 13 may be formed so as to have more than four members thereby making possible cylindrical frame having somewhat greater axial length, four members provide a good ratio of drum diameter to height.

It is to be understood that though the preferred arrangement is that in which the frame members are of such size that they may seat in the ring members, they may be made somewhat larger. However, in that event, the frame members would not seat within the drumheads.

It should also be noted that the fastening means provided between adjacent frame members results in a tightly closed arrangement suitable for providing the required sound box. With smaller diameter drums having less axial length or height the four corner holes in each frame member may be dispensed with and instead two holes one adjacent each end of the longitudinal center line of each member may be utilized. In such an arrangement all but the free ends of the two outer members may be permanently joined by rivets but leaving the members relatively rotatable. The erection of such a frame member may be completed by joining the free ends of the end members by a bolt.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A readily erectable percussion drum, comprising a pair of annular drumheads each including a peripheral ring having a predetermined diameter and a membrane carried thereby, a plurality of substantially rectangular sheet-like members each nestable within said ring members, means permanently joining said sheet-like members with adjacent end portions thereof in overlapping relation and with the sheet-like members rotatable each in its own plane and relative to each other, means for joining the free ends of the outer sheet-like members and thereby form a substantially cylindrical array having a diameter substantially equal to that of said rings, and means for securing said drumheads one on and closing each end of said array.

2. A readily erectable percussion drum, comprising a pair of annular drumheads each including a peripheral ring having a predetermined diameter and a membrane carried thereby, a plurality of substantially rectangular sheet-like members each nestable within said ring members, means joining said sheet-like members with adjacent end portions thereof in overlapping relation and with the sheet-like members rotatable each in its own plane and relative to each other and with the diagonally opposite corner portions of each of the intermediate ones of said sheet-like members being secured permanently to the corresponding corner portion of adjacent members.

References Cited in the file of this patent

UNITED STATES PATENTS

| | | |
|---|---|---|
| 961,556 | Thompson | June 14, 1910 |
| 966,477 | Sapp | Aug. 9, 1910 |
| 1,223,237 | Barry | Apr. 17, 1917 |
| 1,391,786 | Nelson | Sept. 27, 1921 |